(12) United States Patent
Asaoka et al.

(10) Patent No.: US 8,314,909 B2
(45) Date of Patent: Nov. 20, 2012

(54) LIQUID CRYSTAL DISPLAY

(75) Inventors: Yasushi Asaoka, Osaka (JP); Kiyoshi Minoura, Osaka (JP); Eiji Satoh, Osaka (JP); Sayuri Fujiwara, Osaka (JP)

(73) Assignee: Sharp Kabushiki Kasiaha, Osaka-shi, Osaka (JP)

( * ) Notice: Subject to any disclaimer, the term of this patent is extended or adjusted under 35 U.S.C. 154(b) by 411 days.

(21) Appl. No.: 12/745,084

(22) PCT Filed: Oct. 28, 2008

(86) PCT No.: PCT/JP2008/003063
§ 371 (c)(1),
(2), (4) Date: May 27, 2010

(87) PCT Pub. No.: WO2009/069249
PCT Pub. Date: Jun. 4, 2009

(65) Prior Publication Data
US 2010/0302488 A1 Dec. 2, 2010

(30) Foreign Application Priority Data
Nov. 30, 2007 (JP) .................................. 2007-311391

(51) Int. Cl.
*G02F 1/1337* (2006.01)
(52) U.S. Cl. ............................. 349/123; 349/96; 349/98
(58) Field of Classification Search .................... 349/73, 349/74, 96, 98, 123, 128, 129, 130, 132, 349/142, 155, 156, 157, 158, 182
See application file for complete search history.

(56) References Cited

U.S. PATENT DOCUMENTS 5,627,665 A 5/1997 Yamada et al.
(Continued)

FOREIGN PATENT DOCUMENTS

| CN | 1179552 A | 4/1998 |
| JP | 05-061025 | 3/1993 |

OTHER PUBLICATIONS

English translation of the International Preliminary Report on Patentability mailed Jun. 17, 2010 in corresponding PCT Application No. PCT/JP2008/003063. International Search Report for PCT/JP2008/003063, mailed Dec. 16, 2008.

*Primary Examiner* — Brian Healy
(74) *Attorney, Agent, or Firm* — Nixon & Vanderhye, P.C.

(57) ABSTRACT

A liquid crystal display device 100 includes: a liquid crystal layer 1; a front substrate 3 and a rear substrate 2 between which the liquid crystal layer 1 is held; a pair of electrodes 4, 8 between which the liquid crystal layer 1 is interposed and which are configured to apply a voltage across the liquid crystal layer 1; circular polarizers 15, 16 respectively provided on a front side of the front substrate 3 and a rear side of the rear substrate 2; and first and second alignment films 13, 12 respectively provided between the liquid crystal layer 1 and the front substrate 3 and between the liquid crystal layer 1 and the rear substrate 2. The liquid crystal layer 1 includes, in each of the pixels, a continuous wall 10, a plurality of small sections 14 separated by the wall 10, and a plurality of liquid crystal regions 11, each of which is formed in any one of the plurality of small sections 14. The plurality of liquid crystal regions 11 include first and second liquid crystal regions which have directors 20 in a plane parallel to the liquid crystal layer 1, the directors 20 of the first and second liquid crystal regions are oriented in different directions.

11 Claims, 7 Drawing Sheets

U.S. PATENT DOCUMENTS

| | | | |
|---|---|---|---|
| 5,636,043 A | 6/1997 | Uemura et al. | |
| 7,573,551 B2 * | 8/2009 | Koma et al. | 349/114 |
| 7,876,407 B2 * | 1/2011 | Koma et al. | 349/114 |
| 8,089,596 B2 * | 1/2012 | Koma et al. | 349/129 |
| 2002/0001053 A1 | 1/2002 | Nakao et al. | |
| 2002/0130989 A1 | 9/2002 | Nakao et al. | |
| 2003/0011731 A1 | 1/2003 | Yoshida et al. | |
| 2005/0270449 A1 * | 12/2005 | Koma et al. | 349/114 |
| 2010/0302488 A1 * | 12/2010 | Asaoka et al. | 349/123 |

* cited by examiner

POLARIZER
TRANSMISSION AXES

FIG.8

LIQUID CRYSTAL DISPLAY

This application is the U.S. national phase of International Application No. PCT/JP2008/003063 filed 28 Oct. 2008 which designated the U.S. and claims priority to JP Application No. 2007-311391 filed 30 Nov. 2007, the entire contents of each of which are hereby incorporated by reference.

TECHNICAL FIELD

The present invention relates to a liquid crystal display device.

BACKGROUND ART

In recent years, development of liquid crystal display devices has been greatly advancing, and their display performance has been greatly improving. However, further improvements in display performance are demanded of some product forms that use liquid crystal display devices. In particular, practical realization of a liquid crystal display device which is capable of performing display with high luminance and high definition as well as providing excellent viewing angle characteristics as compared with conventional devices is demanded.

In general, liquid crystal display devices include a pair of substrates and a liquid crystal layer interposed between these substrates. For example, in active matrix display devices which use thin film transistors, one of the substrates is provided with pixel electrodes for applying voltages to the liquid crystal layer and thin film transistors provided as switching elements corresponding to the respective pixels, and the other substrate is provided with a counter electrode. Surfaces of the substrates which are in contact with the liquid crystal layer are covered with alignment films for regulating the alignment of liquid crystal molecules.

A known technique for improving the viewing angle characteristics of such liquid crystal display devices is to provide, in one or both of the substrates between which the liquid crystal layer is held, a structure for regulating the liquid crystal alignment (hereinafter, simply "alignment regulating structure") such that a plurality of domains that have different alignments of liquid crystal molecules are formed in one pixel (alignment division). For example, a structure in which liquid crystal molecules are oriented vertically to the substrates and a slit provided in the pixel electrode made of a transparent conductive material (for example, ITO; Indium Tin Oxide) and a protrusion (rib) provided in the counter substrate regulate the alignment of liquid crystal molecules (MVA mode; Multi-domain Vertical Alignment), and a structure in which slits provided in the pixel electrode and the counter electrode are used to incline liquid crystal molecules according to an electric field extending in an oblique direction or "oblique electric field" (PVA mode; Patterned-ITO Vertical Alignment) have been proposed.

However, in the PVA mode and MVA mode liquid crystal display devices, it is necessary to form a complicated alignment control structure, such as slit or rib, so as to be incorporated in a pixel. Therefore, in terms of processing accuracy, transmittance of light, or any other factor, improvements in the viewing angle characteristics and display brightness are limited.

On the other hand, a technique for improving the viewing angle characteristics by a simpler structure, without forming a complicated alignment control structure, has been proposed. For example, Patent Document 1 proposes that a plurality of liquid crystal droplets (liquid crystal regions) are formed in the liquid crystal layer, and this is utilized for enlarging the viewing angle.

Patent Document 1 discloses a polymer dispersed liquid crystal display device that uses a liquid crystal layer in which liquid crystal droplets are dispersed in a resin (FIG. 61 of Patent Document 1). Outside the pair of substrates between which the liquid crystal layer is held, a pair of linear polarizers are provided in a crossed Nicols arrangement, and λ/4 plates are provided between the respective linear polarizers and the liquid crystal layer. In this liquid crystal display device, in the absence of an applied voltage across the liquid crystal layer, the liquid crystal molecules in the liquid crystal droplets are radially oriented (FIG. 63 of Patent Document 1), resulting in a white display state. When a voltage is applied across the liquid crystal layer, the liquid crystal molecules in the respective liquid crystal droplets are oriented vertical to the substrate surfaces, resulting in a black display state.

Thus, a liquid crystal display device can be obtained which can be manufactured by a convenient process at a low cost as compared with the technique of forming a rib in a substrate and the technique of forming a slit in an electrode, and which has improved viewing angle characteristics.

Patent Document 1: Japanese Laid-Open Patent Publication No. 2002-303869
Patent Document 2: Japanese Laid-Open Patent Publication No. 7-120728
Patent Document 3: Japanese Laid-Open Patent Publication No. 2000-206515
Patent Document 4: Japanese Laid-Open Patent Publication No. 5-61025

DISCLOSURE OF INVENTION

Problems to be Solved by the Invention

In the liquid crystal display device described in Patent Document 1, when a voltage is not applied across the liquid crystal layer, the liquid crystal molecules in a liquid crystal droplet are radially oriented around a disclination point that occurs substantially at the center of the liquid crystal droplet. The directors of the liquid crystal droplets have an inclination relative to the thickness direction of the liquid crystal layer, and the inclination varies among the liquid crystal regions due to the shape of the liquid crystal droplets, etc. Therefore, the retardation disadvantageously varies at different positions across a plane of the liquid crystal layer.

When a voltage is applied across the liquid crystal layer, the liquid crystal molecules in the liquid crystal droplets are likely to be oriented vertically in a plane of the liquid crystal layer (oriented parallel to an electric field). In this situation, part of the radially-oriented liquid crystal molecules rotate clockwise, and the other rotate counterclockwise. Therefore, the alignment inside the liquid crystal droplet transiently becomes disordered, so that some time is required before a stable alignment that depends on the voltage is reached. Thus, the liquid crystal molecules in the liquid crystal droplet lack harmony in motion and hence becomes disordered, so that the response speed decreases.

Furthermore, at the time of white display, light is not transmitted at and near the disclination point that occurs substantially at the center of each liquid crystal droplet, so that the display brightness disadvantageously decreases.

The present invention was conceived in view of the above circumstances. One of the objects of the present invention is to improve the viewing angle characteristics of a liquid crystal display device while securing high response characteristics, without forming a complicated structure for alignment division.

Means for Solving the Problems

A liquid crystal display device of the present invention is a liquid crystal display device having a plurality of pixels, including: a liquid crystal layer; a front substrate and a rear substrate between which the liquid crystal layer is held; a pair of electrodes between which the liquid crystal layer is interposed and which are configured to apply a voltage across the liquid crystal layer; circular polarizers respectively provided on a front side of the front substrate and a rear side of the rear substrate; and first and second alignment films respectively provided between the liquid crystal layer and the front substrate and between the liquid crystal layer and the rear substrate, wherein the liquid crystal layer includes, in each of the pixels, a continuous wall, a plurality of small sections separated by the wall, and a plurality of liquid crystal regions, each of which is formed in any one of the plurality of small sections, and the plurality of liquid crystal regions include first and second liquid crystal regions which have directors in a plane parallel to the liquid crystal layer, the directors of the first and second liquid crystal regions are oriented in different directions.

In a preferred embodiment, another small section does not intervene between each of the plurality of small sections and the first and second alignment films.

In a preferred embodiment, another small section does not intervene between each of the plurality of small sections and one of the first and second alignment films which is closer to the each small section.

Preferably, each of the plurality of liquid crystal regions is in contact with any one of the first and second alignment films.

Preferably, the first and second alignment films are not provided with an alignment treatment.

The surface free energy of the first and second alignment films may be not less than 44 mJ/m$^2$ and not more than 50 mJ/m$^2$.

The liquid crystal layer preferably includes four or more small sections in each pixel. More preferably, the liquid crystal layer includes eight or more small sections in each pixel.

In a preferred embodiment, a dielectric anisotropy of a liquid crystal material of the liquid crystal layer is positive.

In a preferred embodiment, the liquid crystal region does not contain a chiral agent.

The average length of the plurality of small sections along a thickness direction of the liquid crystal layer may be not less than 2 μm and not more than 6 μm. The average length of the plurality of small sections in a plane parallel to the liquid crystal layer may be not less than 2 μm and not more than 50 μm.

Effects of the Invention

In a liquid crystal display device of the present invention, at least two liquid crystal regions which have directors in a plane parallel to the liquid crystal layer are included in one pixel. The directors of these liquid crystal regions are oriented in different directions from one another. Therefore, the viewing angle characteristics can be improved.

Since the directors of the liquid crystal regions are in a plane, the variation in retardation across the plane of the liquid crystal layer can be decreased.

Further, each of the liquid crystal regions is regarded as a mono-domain which has a director that is parallel to the liquid crystal layer. Therefore, when a voltage is applied across this liquid crystal layer, the liquid crystal molecules in the liquid crystal region move harmoniously as one director to be oriented along the thickness direction of the liquid crystal layer. Thus, the alignment inside the liquid crystal region can be switched more quickly, and the response characteristics of the liquid crystal display device can be greatly improved, as compared with a case where the liquid crystal molecules in the liquid crystal region are radially oriented.

The present invention is advantageous in that an effect similar to alignment division can be obtained by a simpler structure, without forming a complicated structure, such as a rib or slit, in a pixel, and that a liquid crystal display device with excellent viewing angle characteristics can be manufactured using a convenient process at a low cost.

BRIEF DESCRIPTION OF DRAWINGS

[FIG. 1] (a) is a cross-sectional view schematically showing a liquid crystal display device of an embodiment of the present invention. (b) is a cross-sectional view of the liquid crystal display device taken along line Ib-Ib' of (a), schematically showing a liquid crystal layer in a single pixel.

[FIG. 2] (a) and (b) are schematic diagrams for illustrating the display principles of the liquid crystal display device of the embodiment of the present invention. (a) and (b) are cross-sectional views which illustrate examples of the alignment of liquid crystal molecules in a liquid crystal region in the absence and presence of an applied voltage across the liquid crystal layer.

[FIG. 3] (a) and (b) show cross-sectional SEM images of liquid crystal layers of sample liquid crystal cells No. 1 and No. 2 which include horizontal alignment films A and B, respectively.

[FIG. 4] (a) and (b) are schematic plan and cross-sectional views showing an example of the alignment of liquid crystal molecules in liquid crystal regions.

[FIG. 5] (a) is a microscopic image obtained by observation of sample liquid crystal cell No. 5 using a polarizing microscope in crossed Nicols. (b) shows a microscopic image obtained with the polarizer being rotated by 45° from the arrangement of (a).

[FIG. 6] (a) and (b) show a cross-sectional SEM image and a planar SEM image of sample liquid crystal cell No. 5.

DESCRIPTION OF THE REFERENCE NUMERALS

| | |
|---|---|
| 1 | liquid crystal layer |
| 2 | rear substrate |
| 3 | front substrate |
| 4 | pixel electrode |
| 5 | thin film transistor |
| 6 | color filter |
| 7 | planarization film |
| 8 | counter electrode |
| 10 | wall |
| 11 | liquid crystal region |

-continued

| 12, 13 | alignment film |
| 14, 14L, 14U | small section |
| 15, 16 | circular polarizer |
| 20 | director |
| 22 | liquid crystal molecule |
| 24, 26 | light |
| 32, 33 | glass substrate |
| 36 | pole |
| 100 | liquid crystal display device |

BEST MODE FOR CARRYING OUT THE INVENTION

Hereinafter, a liquid crystal display device, which is a preferred embodiment of the present invention, is described with reference to FIG. 1 and FIG. 2.

FIG. 1(a) is a cross-sectional view schematically showing the liquid crystal display device of the embodiment of the present invention. FIG. 1(b) is a schematic view for illustrating a structure of a liquid crystal layer in a single pixel when a voltage is not applied across the liquid crystal layer (in the absence of an applied voltage), showing a cross section that is parallel to substrates. FIGS. 2(a) and 2(b) are schematic cross-sectional views showing examples of alignment of liquid crystal molecules in a liquid crystal region when a voltage is not applied across the liquid crystal layer (in the absence of an applied voltage) and when a voltage is applied across the liquid crystal layer (in the presence of an applied voltage).

First, refer to FIG. 1(a). The liquid crystal display device 100 includes a front substrate 3, a rear substrate 2 provided so as to oppose the front substrate 3, a liquid crystal layer 1 provided between these substrates 2, 3, and circular polarizers 15, 16 provided on the front side of the front substrate 3 and the rear side of the rear substrate 2, respectively. Although not shown, the circular polarizers 15, 16 have a layered structure formed by a linear polarizer and a λ/4 plate. The circular polarizers 15, 16 are placed such that the absorption axes of their linear polarizers are perpendicular to each other (crossed Nicols arrangement). The liquid crystal layer 1 is configured such that light passing through the liquid crystal layer 1 during white display is retarded by about a half of the wavelength. Specifically, the retardation of the liquid crystal layer 1 (the product of birefringence value Δn and thickness d of the liquid crystal layer 1, Δn·d) is set to 0.29 to 0.38 μm.

A surface of the rear substrate 2 on the liquid crystal layer side is provided with a plurality of switching elements (herein, thin film transistors) 5, a plurality of transparent pixel electrodes 4, and an alignment film 12 in this order. In the present embodiment, the alignment film 12 is a horizontal alignment film and is in contact with the rear side surface of the liquid crystal layer 1. The plurality of pixel electrodes 4 are mutually separated to define pixels, each of which is a unit of displaying of images. In the present embodiment, these pixel electrodes 4 are in a matrix arrangement and are each electrically coupled to the source electrode (not shown) of a corresponding one of the thin film transistors 5.

On the other hand, a surface of the front substrate 3 on the liquid crystal layer side is provided with color filters 6 of, for example, R (red), G (green), and B (blue) which are arranged so as to correspond to the pixel electrodes 4, a planarization film 7 covering the color filters 6 to provide a flat surface, a transparent counter electrode 8, and an alignment film 13 in this order. The alignment film 13 is in contact with the front side surface of the liquid crystal layer 1. In the present embodiment, the alignment film 13 is also a horizontal alignment film as the alignment film 12 is.

The liquid crystal layer 1 is divided by walls 10 into a plurality of small sections 14. In each of the small sections 14, a liquid crystal region 11 is formed. The walls 10 are made of, for example, a polymer. Note that, although in FIG. 1(a) the walls 10 and the alignment films 12, 13 surround the spaces that constitute the small sections 14, only the walls 10 may surround the spaces that constitute the small sections 14.

As seen from FIG. 1(b), at least two small sections are provided in each pixel, and the walls 10 are continuous. The liquid crystal regions 11 in these small sections 14 have directors 20 in a plane that is parallel to the liquid crystal layer 1. The directors 20 of the liquid crystal regions 11 are oriented in random directions in the plane. Note that, in the present embodiment, at least two liquid crystal regions 11 which have directors 20 in the plane and of which the orientations of the directors 20 are mutually different may be provided in one pixel.

Next, an example of the alignment of liquid crystal molecules in each of the liquid crystal regions 11 is described in detail with reference to FIG. 2(a). As shown, in the absence of an applied voltage, part of the liquid crystal molecules 22 in the liquid crystal region 11 are affected by the alignment films 12, 13 to be oriented in parallel. Another part of the liquid crystal molecules 22 in the liquid crystal region 11 are affected by the walls 10 to incline. However, the alignment of the liquid crystal molecules 22 in the liquid crystal region 11 is continuous so that the liquid crystal molecules 22 in the liquid crystal region 11 constitute a mono-domain in which the alignment orientation is represented by one director 20.

Thus, in the present embodiment, the directors 20 of a plurality of liquid crystal regions 11 included in a pixel region are randomly oriented in a plane. Therefore, the viewing angle characteristics can be improved as in the conventional multi-domain structures. The retardation can be generally uniform across the plane of the liquid crystal layer, so that display unevenness which would occur due to variation in retardation can be prevented. Further, since the liquid crystal molecules in each of the liquid crystal regions 11 behave as a mono-domain, the response characteristics in the presence of an applied voltage can be greatly improved as compared with, for example, a case where liquid crystal droplets which have a radial alignment are used as described in Patent Document 1. Further, inside the liquid crystal regions 11, there is no disclination that would inhibit transmission of light, so that the transmittance can be maintained high. Moreover, as in the above-described MVA mode and PVA mode display devices, alignment division can be realized without forming a complicated alignment control structure, such as a rib or slit, in a pixel, and hence, the present embodiment is advantageous in terms of the manufacturing process and the manufacturing cost.

Now, the display principles of the liquid crystal display device 100 are described with reference to FIGS. 2(a) and 2(b).

As shown in FIG. 2(a), in the absence of an applied voltage, the director 20 of the liquid crystal region 11 is oriented parallel to the substrates 2, 3. Considering light 24 which comes in at the rear side of the rear substrate 2, the light 24 is first transmitted through the circular polarizer 16 formed by a linear polarizer and a λ/4 plate to become right-handed or left-handed circular polarization 24a which then enters the liquid crystal layer. In the liquid crystal layer, the circular polarization 24a is retarded by phase difference it because the director 20 is parallel to the substrates 2, 3, resulting in opposite-handed circular polarization 24b. As described above, the linear polarizers of the circular polarizers 15, 16 are placed such that their absorption axes are perpendicular to each other. Therefore, the circular polarization 24b is transmitted through the circular polarizer 15 to become linear polarization which then outgoes toward the viewer side. Thus, a white display state is obtained.

Figure 2:
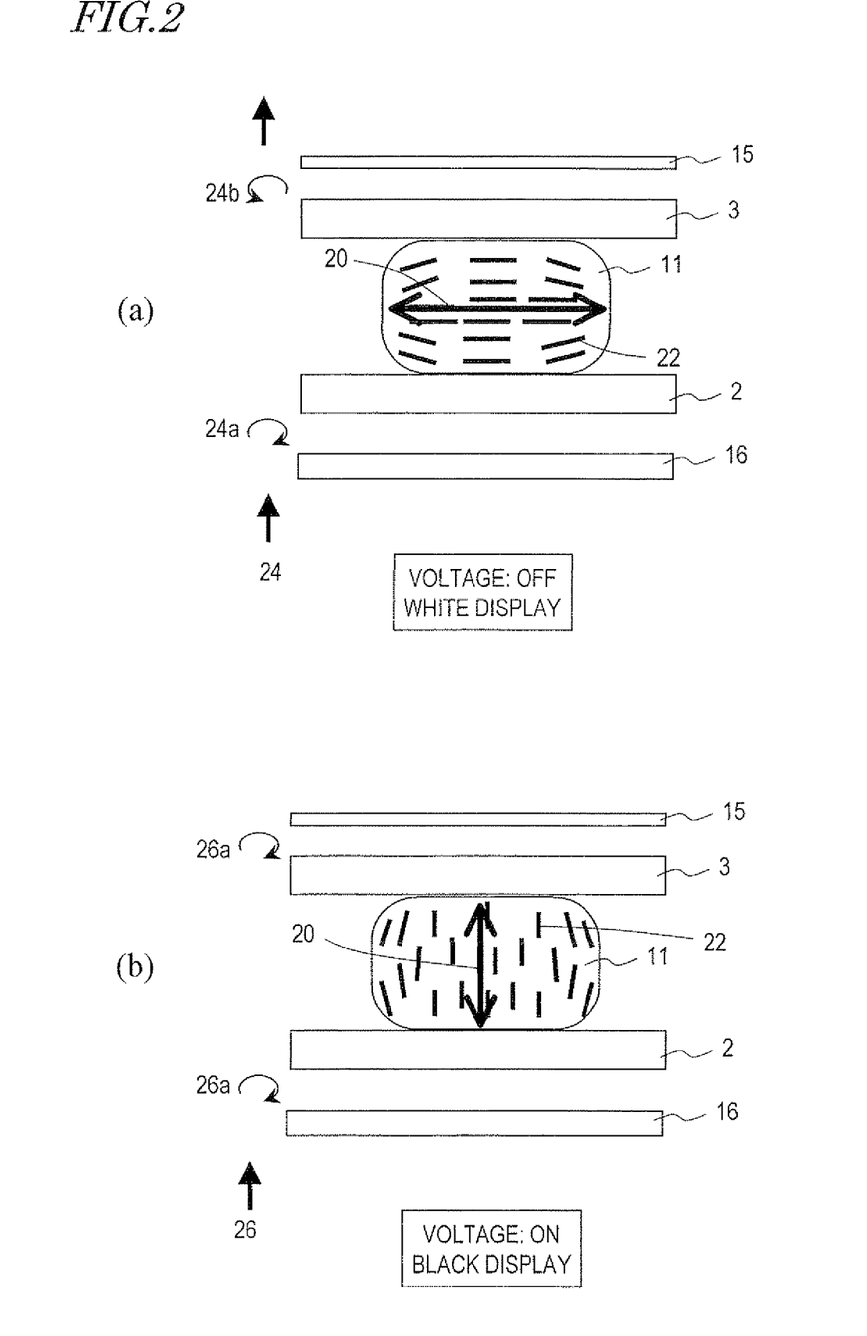

On the other hand, as shown in FIG. 2(*b*), when a voltage not lower than a predetermined value is applied across the liquid crystal layer 1, the director 20 of the liquid crystal region 11 is oriented vertically to the substrates 2, 3. In this case, considering light 26 which comes in at the rear side of the rear substrate 2, the light 26 is transmitted through the circular polarizer 16 to become right-handed or left-handed circular polarization 26a which is then transmitted through the liquid crystal layer. In the liquid crystal layer, the circular polarization 26a is not retarded because the director 20 is vertical to the substrates 2, 3, so that the circular polarization 26a itself goes out of the liquid crystal layer as what it is. Since the circular polarization 26a cannot be transmitted through the circular polarizer 15, the light 26 does not outgo toward the viewer side, resulting in a black display state.

Although not shown, when a voltage lower than the predetermined value is applied across the liquid crystal layer, the director of the liquid crystal region is oriented in a direction inclined relative to the thickness direction of the liquid crystal layer. In this case, the liquid crystal layer retards circular polarization that is transmitted through the liquid crystal layer by a phase difference which is greater than 0 and smaller than u, enabling intermediate grayscale level display. The in-plane component of the director of each liquid crystal region in an intermediate grayscale level display state depends on the director in a white display state, so that the directors of the respective liquid crystal regions are oriented in different directions, thus producing an alignment division effect.

Japanese Laid-Open Patent Publication No. 7-120728 also describes a display device which uses a liquid crystal layer having a plurality of liquid crystal regions. However, in this display device, the liquid crystal molecules in a liquid crystal region in the absence of an applied voltage are in a radial or concentric alignment, so that there is no director in a plane. Therefore, the alignment division effect as produced in the present embodiment by utilizing the in-plane director cannot be obtained. Since each liquid crystal region has a radial or concentric alignment, a disclination occurs generally at the center of the liquid crystal region, so that the transmittance disadvantageously decreases. Also, the motion of the liquid crystal molecules is sluggish, so that it is difficult to realize high response characteristics.

Japanese Laid-Open Patent Publication No. 2000-206515 proposes to use, in a TN (Twisted Nematic) mode liquid crystal display device, a liquid crystal layer which includes a plurality of liquid crystal regions for the purpose of omitting the front substrate and hence reducing the weight of the display device. However, the directors of these liquid crystal regions are oriented in a predetermined direction defined by the alignment films. Thus, this configuration cannot achieve an alignment division effect as produced in the present embodiment by providing liquid crystal regions of different directors in one pixel, and therefore has a difficulty in achieving high viewing angle characteristics.

Japanese Laid-Open Patent Publication No. 5-61025 also discloses a liquid crystal display device which utilizes a plurality of liquid crystal droplets (liquid crystal regions). This liquid crystal display device intends to produce high-contrast, multicolor display by using four different liquid crystal droplets which includes liquid crystal and different dichromatic dyes (blue, green, red, black). Therefore, Japanese Laid-Open Patent Publication No. 5-61025 does not intend to provide alignment division by utilizing liquid crystal regions of different directors as in the present embodiment. Also, this liquid crystal display device does not utilize the display principles previously described with reference to FIG. 2 or use a circular polarizer.

In the present embodiment, the director 20 of the liquid crystal region 11 in each of the small sections 14 is affected by the anchoring forces produced by the alignment films 12, 13 and is affected by the structure of the small section 14. To allow the directors 20 of the respective liquid crystal regions 11 to be oriented in random directions in a plane, the alignment films 12, 13 are preferably not provided with an alignment treatment, such as a rubbing treatment. If a rubbing treatment or the like is not performed on the alignment films 12, 13, all the plurality of liquid crystal regions 11 in a pixel are not oriented in one specific direction (e.g., rubbing direction), resulting in a random alignment. This further ensures formation of the liquid crystal regions 11 of different alignment orientations in one pixel, and thus can improve the viewing angle characteristics.

To more surely regulate the alignment of the liquid crystal regions 11 by means of the alignment films 12, 13, it is preferable that at least two of the liquid crystal regions 11 formed in one pixel are in contact with one or both of the alignment films 12, 13. This more surely allows the liquid crystal molecules in these liquid crystal regions 11 to be oriented in a direction generally parallel to the substrate. Note that, in this specification, the statement that "a liquid crystal region 11 is in contact with the alignment film 12, 13" includes a case where part of the liquid crystal molecules in the liquid crystal regions 11 are in direct contact with the alignment film 12, 13 as well as a case where the liquid crystal molecules of the liquid crystal regions 11 are affected by the alignment film 12, 13 even when a very thin film (e.g., 10 nm or less) which contains liquid crystal molecules, polymers, etc., intervenes between the liquid crystal region 11 and the alignment film 12, 13.

The small sections 14 are preferably arranged in one or two layers with respect to the thickness direction of the liquid crystal layer 1. If the small sections 14 are arranged in three or more layers with respect to the thickness direction of the liquid crystal layer 1, the liquid crystal regions located between the uppermost layer and the lowermost layer are not affected by the alignment films 12, 13 and are therefore not regarded as a mono-domain which has a director in a plane. If the liquid crystal layer 1 includes a large number of such liquid crystal regions, there is a probability that an alignment division effect is not sufficiently achieved, or the effect of improving the response speed deteriorates. Also, there is a probability that variation in retardation across a plane of the liquid crystal layer cannot be sufficiently reduced. Further, there is a probability that the liquid crystal layer 1 becomes relatively thick for the retardation it produces, so that the driving voltage becomes disadvantageously high. On the other hand, if the small sections 14 are arranged in not more than two layers with respect to the thickness direction of the liquid crystal layer 1, almost all of the liquid crystal regions 11 in one pixel can be in contact with the alignment film 12, 13, so that the effect of improving the response speed, which is produced by the present invention, can be increased. Further, the retardation can be generally uniform across a plane of the liquid crystal layer plane so that the display unevenness can effectively be reduced. Further, the liquid crystal layer 1 can be configured to have a small thickness, and hence, the driving voltage can be decreased.

Note that the statement that the small sections 14 are arranged in one layer with respect to the thickness direction of the liquid crystal layer 1 (hereinafter, "one-layer structure") means that another small section does not intervene between each of the plurality of small sections 14 and the alignment film 12, 13. The statement that the small sections 14 are arranged in two layers with respect to the thickness direction of the liquid crystal layer 1 (hereinafter, "two-layer structure") means that another small section does not intervene between each of the plurality of small sections 14 and one of the alignment films 12, 13 which is closer to the small section 14.

As will be described later, to form the small sections 14 such that the liquid crystal regions 11 are in contact with the alignment films 12, 13, it is preferable that the surface free energy of the alignment films 12, 13 is optimized. The present inventors reached this knowledge after conducting various examinations. The suitable range of the surface free energy is, for example, not less than 44 mJ/m$^2$ and not more than 50 mJ/m$^2$, although it depends on the material of the liquid crystal layer 1.

In the present embodiment, the number of small sections 14 (i.e., the number of liquid crystal regions 11) included in one pixel may be two or more, and is preferably four or more. If the number of small sections 14 is four or more, one pixel can be divided into four or more regions of different alignment orientations, so that the viewing angle characteristics can be effectively improved. More preferably, the number of the small sections 14 included in one pixel is eight or more. On the other hand, if one pixel includes too many small sections 14, the size of each small section 14 decreases, so that liquid crystal regions 11 which are not in contact with the alignment film 12, 13 are more likely to occur. Also, it is probable that the motion of the liquid crystal molecules becomes sluggish due to the interaction between the walls 10 of the small sections 14 and the liquid crystal molecules, so that the response speed decreases. For example, under the circumstance where the pixel size is 80×220 μm and the average width of the small sections 14 (average width $W_{AVE}$ which will be described later) is 5 μm or more, the upper limit of the number of small sections 14 included in one pixel is about 700.

The average of length H of the small sections 14 along the thickness direction of the liquid crystal layer 1 (hereinafter, simply "average height $H_{AVE}$") is preferably ⅓ or more of the thickness of the liquid crystal layer 1. More preferably, it is ½ or more of the thickness of the liquid crystal layer 1. If average height $H_{AVE}$ of the small sections 14 is smaller than ⅓ of the liquid crystal layer 1, liquid crystal regions 11 which are free of the effects of the alignment films 12, 13 are likely to occur in part of the liquid crystal layer 1 at the center of its thickness. In such liquid crystal regions 11, the liquid crystal molecules are oriented along the thickness direction of the liquid crystal layer 1, so that the director 20 does not exists in its plane. As a result, it becomes difficult to control the alignment of the liquid crystal molecules in the absence of an applied voltage.

On the other hand, the average of maximum width W of the small sections 14 in a plane of the liquid crystal layer 1 (hereinafter, simply "average width $W_{AVE}$") is preferably not more than ½ of the pixel width. More preferably, it is not more than ⅓ of the pixel width. This ensures that four or more small sections 14 are provided in one pixel. On the other hand, if average width $W_{AVE}$ is too small, the liquid crystal regions 11 are more unlikely to come into contact with the alignment film 12, 13. Also, the motion of the liquid crystal molecules becomes sluggish due to the interaction between the walls 10 of the small sections 14 and the liquid crystal molecules. For example, under the circumstance where the pixel size is 80×220 μm and average width $W_{AVE}$ of the small sections 14 is 5 μm or more, average width $W_{AVE}$ is ¹⁄₄₄ or more of the pixel width.

Preferably, average height $H_{AVE}$ of the small sections 14 is appropriately selected within the range of, for example, not less than 2 μm and not more than 6 μm, while average width $W_{AVE}$ is appropriately selected within the range of, for example, not less than 2 μm and not more than 50 μm. The reasons for these conditions are described below.

If a liquid crystal region 11 in a small section 14 is too large, discontinuous alignment of liquid crystal molecules, i.e., disclination, readily occurs in the liquid crystal region 11. If a disclination occurs, a portion which does not transmit light even in a white display state is generated in the liquid crystal regions 11. Therefore, it can be a factor that deteriorates the brightness of the white display. Also, the motion of the liquid crystal molecules becomes sluggish near the disclination of the liquid crystal region 11, and therefore, there is a probability that the response speed decreases. Thus, the size of the liquid crystal region 11 is preferably decreased such that disclination does not occur. For example, average height $H_{AVE}$ of the small sections 14 is not more than 6 μm while average width $W_{AVE}$ of the small sections 14 is not more than 50 whereby occurrence of a disclination in the liquid crystal region 11 in the small section 14 can effectively be prevented.

Further, if average width $W_{AVE}$ of the small sections is more than 50 μm, the number of small sections 14 included in one pixel, i.e., the number of liquid crystal regions 11 included in one pixel, decreases so that there is a probability that the azimuthal dependence occurs in some pixels, causing uneven display. However, occurrence of such an uneven display can be prevented so long as average width $W_{AVE}$ is 50 μm or less.

On the other hand, if average height $H_{AVE}$ or average width $W_{AVE}$ of the small sections 14 is less than 2 μm, the effects of the interaction between the walls 10 of the small sections 14 and the liquid crystal molecules of the liquid crystal regions 11 significantly increase so that the motion of the liquid crystal molecules becomes sluggish. Also, the number of liquid crystal regions 11 which are not in contact with the alignment film 12, 13 is likely to increase, so that there is a probability that the viewing angle characteristics and the response speed cannot be sufficiently improved. Therefore, both average height $H_{AVE}$ and average width $W_{AVE}$ of the small sections 14 are preferably 2 μm or more.

The material of the liquid crystal layer 1 is not limited to any particular one, but the dielectric anisotropy of the liquid crystal material of the liquid crystal layer is preferably positive. Although the liquid crystal molecules are expected to incline so as to be in parallel with the substrate when the voltage is on, the direction of the inclination cannot be controlled if the dielectric anisotropy of the liquid crystal material is negative, so that the molecules in the liquid crystal droplets readily deviate from a homogeneous alignment. As a result, there is a probability that a disclination occurs in the liquid crystal region, or the motion of the liquid crystal molecules is impeded. To utilize the display principles which have been previously described with reference to FIG. 2, the liquid crystal layer preferably does not contain a chiral agent.

The liquid crystal layer 1 of the present embodiment can be formed using a material which is similar to the Polymer Dispersed Liquid Crystal (PDLC). For example, the liquid crystal layer 1 may be formed by preparing a mixture of a nematic liquid crystal material (i.e., low molecular weight liquid crystal composition) and a photocurable resin (monomer and/or oligomer) such that they are compatible with each other, providing the mixture between transparent substrates, and then polymerizing the photocurable resin. Although the type of the photocurable resin is not limited to any particular one, a UV-curable resin is preferably used. When the UV-curable resin is used, the above mixture need not to be heated during the polymerization, and therefore, adverse effects of the heat on other elements can be prevented. The monomer and oligomer may be monofunctional or polyfunctional.

In the present embodiment, the liquid crystal layer 1 is formed by photocuring a mixture of a UV-curable resin and a liquid crystal composition which exhibits liquid crystal properties (liquid crystal mixture) by irradiation with active energy rays, such as ultraviolet rays. The liquid crystal mixture may be, for example, a liquid crystal mixture that exhibits a nematic liquid crystal phase at normal temperature, which may be prepared by mixing a UV-curable material and a liquid crystal in the proportion by weight of 20:80 and adding a small amount of photoinitiator to the mixture.

The above liquid crystal mixture is provided between a pair of substrates by, for example, a vacuum injection method or a One Drop Fill (ODF) method and then irradiate with ultraviolet. As a result of this, the UV-curable prepolymer is polymerized to become a polymer which is phase-separated from the liquid crystal, whereby a liquid crystal layer is formed which includes walls of the polymer and a plurality of liquid crystal regions separated by the walls.

Note that liquid crystal display devices which use PDLC (polymer dispersed liquid crystal display devices) do not use a polarizer or an alignment film. PDLC is capable of switching the optical characteristics between a scattering state and a light transmitting state by application of a voltage across the liquid crystal layer, and therefore, using PDLC enables displaying without the use of a polarizer or an alignment film. On the other hand, the present embodiment uses alignment films and circular polarizers although a material which is similar to PDLC is used, thereby realizing a novel multi-domain mode. The liquid crystal layer of the present embodiment has a smaller bifringence $\Delta n$ than PDLC in order to control the retardation ($\Delta n \cdot d$) to a predetermined value (e.g., 0.29 to 0.38 μm), whereas PDLC used in polymer dispersed liquid crystal display devices has relatively large bifringence $\Delta n$ in order to decrease the diameter of the liquid crystal droplets such that the scattering intensity can be increased. For example, when the thickness of the liquid crystal layer, d, is 4 μm, a preferred range of $\Delta n$ is not less than 0.07 and not more than 0.1.

<Manufacturing Method of Liquid Crystal Display Device>

The liquid crystal display device of the present embodiment may be manufactured by, for example, a method described below. In an example described herein, the liquid crystal layer is formed using a vacuum injection method.

First, surfaces of a glass substrate on which thin film transistors and pixel electrodes are formed (rear substrate) and a glass substrate on which color filters and a counter electrode are formed (front substrate) are coated using a spin coat method or an inkjet method to uniformly form alignment films, which are then baked at a predetermine temperature. The alignment films are not provided with a rubbing treatment. The alignment films used herein are horizontal alignment films with the surface free energy of 47 mJ/m$^2$, which was measured by a method that will be described later.

Then, a photocurable monomer, a photoinitiator, a positive-type liquid crystal are uniformly mixed to prepare a liquid crystal mixture. The temperature during mixing is not less than temperature $T_{ni}$ at which the liquid crystal mixture transitions to a nematic phase. The liquid crystal constitutes 80 to 85% of the composition. The resultant mixture is maintained at a temperature not less than transition temperature $T_{ni}$.

Then, the front substrate and the rear substrate are placed so as to oppose each other such that the alignment films are placed inside, and attached to each other via a spacer for securing a predetermined gap therebetween.

While these substrates are maintained at temperature not less than transition temperature $T_{ni}$, a liquid crystal mixture maintained at a temperature not less than transition temperature $T_{ni}$ is injected into the gap between the substrates (vacuum injection method). Thereafter, the mixture is irradiated with light (ultraviolet) at a temperature not less than transition temperature $T_{ni}$ such that a polymer is produced from monomers contained in the mixture and that the polymer and the liquid crystal are phase-separated. In this way, the liquid crystal layer is formed between the front substrate and the rear substrate.

Thereafter, circular polarizers are placed respectively on the front side of the front substrate and on the rear side of the rear substrate so as to sandwich the front substrate and the rear substrate. These circular polarizers are placed such that their linearly-polarizing parts are in a crossed-Nicols arrangement. In this way, the liquid crystal display device is obtained.

In the above-described method, the vacuum injection method is used in the formation of the liquid crystal layer. However, an ODF method may be used instead. A method for forming the liquid crystal layer in such a case is described below.

First, formation of alignment films and preparation of a liquid crystal mixture are performed in the same way as in the case of using the vacuum injection method.

Then, the liquid crystal mixture of a predetermined amount, which is maintained at a temperature not less than transition temperature $T_{ni}$, is dropped on the alignment film of the rear substrate or the front substrate maintained at a temperature not less than transition temperature $T_{ni}$. Thereafter, the other substrate is attached to the substrate on which the mixture has been dropped such that they oppose each other via a spacer.

Then, the liquid crystal mixture between the substrate is irradiated with light (ultraviolet) at a temperature not less than transition temperature $T_{ni}$, such that a polymer is produced from monomers contained in the mixture and that the polymer and the liquid crystal are phase-separated. In this way, the liquid crystal layer is obtained.

In the case where the liquid crystal display device is manufactured using the above-described method, the configuration of the liquid crystal layer, such as the size, shape, arrangement, etc., of the liquid crystal regions, can be controlled by the type of alignment films and the formation conditions for the liquid crystal layer, etc. As will be described below in detail, the size of the liquid crystal regions can be adjusted by changing the irradiation conditions for the liquid crystal mixture. The arrangement of the liquid crystal regions in the liquid crystal layer can be adjusted by changing the type of the alignment films.

<Relationship Between Size of Liquid Crystal Regions and Irradiation Conditions for Liquid Crystal Mixture>

In the present embodiment, to effectively improve the viewing angle characteristics by means of alignment division while securing a high response speed, the size of the small sections (i.e., the size of the liquid crystal regions) need to be controlled to be within a predetermined range. In the case where the above-described liquid crystal mixture is used to form the liquid crystal layer, the size of the liquid crystal regions can be adjusted by changing the irradiation conditions for the liquid crystal mixture. The present inventors examined the relationship between the irradiation conditions and the size of the liquid crystal regions. The procedure and results of the examination are described below.

First, an ITO film and an alignment film are formed in this order on the surfaces of two glass substrates, and then, a liquid crystal mixture is injected between these glass substrates using a vacuum injection method. The method for forming the alignment films and the materials and mixing ratio of the liquid crystal mixture are the same as those described above. Then, the liquid crystal mixture injected between these glass substrates is irradiated so as to be polymerized and phase-separated, whereby the liquid crystal layer is formed. The irradiation intensity is selected within the range of 2 mW/cm$^2$ to 140 mW/cm$^2$. In this way, a plurality of liquid crystal cells with different irradiation intensities (hereinafter, "sample liquid crystal cells") are fabricated.

The light used for irradiation in the fabrication of the sample liquid crystal cells may be light transmitted through a filter that is configured to remove the wavelengths of 350 nm or less, for example. Irradiation with light at 350 nm or less may cause a problem such as decomposition of the liquid crystal contained in the liquid crystal mixture.

The duration of the irradiation is a sufficient period of time for monomers contained in the liquid crystal mixture to be polymerized. Here, the duration of the irradiation may be set such that $T_{ni}$ of the liquid crystal material of the liquid crystal regions is about 99% or more of $T_{ni}'$ of the liquid crystal which is contained in the liquid crystal mixture as a source material. For example, for the irradiation intensity of 50 mW/cm$^2$, the irradiation duration is 50 sec.

Thereafter, the size of the small sections in the respective sample liquid crystal cells is obtained by SEM observation. Specifically, the sample liquid crystal cells are dissected, and the liquid crystal in the small sections is washed away with an organic solvent. Then, the front substrate is peeled away from the resultant sample liquid crystal cells, and a thin conductive film is formed by sputtering. Thereafter, the small sections in the liquid crystal layer are observed from the above. Here, for a plurality of (e.g., 100) small sections included in one pixel, the maximum width of each small section is measured, and the average of the maximum widths (average width), $W_{AVE}$, is calculated.

The results of the SEM observation were compared with results of microscopic observation of the respective sample liquid crystal cells before the dissection with the use of an optical microscope. It was confirmed by the comparison that the SEM-observed shape and arrangement of the small sections were identical to the shape and arrangement of the liquid crystal regions in the respective sample liquid crystal cells before the dissection. Thus, it is inferred that average width WAVE of the small sections which was obtained by SEM observation is equal to the average width of the liquid crystal regions formed in the small sections.

The relationship between average width $W_{AVE}$ of the small sections (i.e., the average width of the liquid crystal regions) which was obtained by SEM observation and the intensity of light for irradiation of the liquid crystal mixture is shown in TABLE 1. As seen from the results shown in TABLE 1, the size of the liquid crystal regions increases as the irradiation intensity decreases, and the size of the liquid crystal regions decreases as the irradiation intensity increases. Hence, it was confirmed that the size of the liquid crystal regions can be controlled by the irradiation intensity. It was found that, to control the average width of the liquid crystal regions so as to be not less than 2 μm and not more than 50 μm, the irradiation intensity may be set within the range of not less than 2 mW/cm$^2$ and not more than 50 mW/cm$^2$. Note that the numeric range of the irradiation intensity depends on the materials and mixing ratio of the liquid crystal mixture.

Although in the example described herein we calculated the average width of the liquid crystal regions, the average height of the liquid crystal regions can also be controlled by the irradiation conditions, as the average width of the liquid crystal regions can be, so long as it is not more than the thickness of the liquid crystal layer (e.g., 4 μm). Note that, if the liquid crystal regions are large so that each extends across the entire thickness of the liquid crystal layer (one-layer structure), the average height of the liquid crystal regions depends on the thickness of the liquid crystal layer and is therefore constant irrespective of the irradiation conditions.

TABLE 1

| Irradiation Intensity (mW/cm$^2$) | 2 | 20 | 50 |
|---|---|---|---|
| Average Width of Small sections or LC Regions (μm) | 50 | 10 | 2 |

<Relationship Between Arrangement of Liquid Crystal Regions and Surface Free Energy of Alignment Films>

To more surely control the liquid crystal alignment of the liquid crystal regions 11, the small sections 14 are preferably arranged in not more than two layers with respect to the thickness direction of the liquid crystal layer 1, so that the alignment of the liquid crystal regions 11 can be regulated by the alignment films 12, 13 in almost all of the small sections 14. The present inventors conducted various examinations as to the fabrication conditions of the liquid crystal cells for controlling the arrangement of the liquid crystal regions 11 and obtained the knowledge that it is important to control the characteristics (surface free energy) of the alignment films 12, 13. Hereinafter, the procedure for examining the fabrication conditions of the liquid crystal cells and the results of the examinations are described below in detail.

Here, four types of horizontal alignment films A to D which have different surface free energies are used. Horizontal alignment film A (trade name AL1T1048 manufactured by JSR Corporation) is an alignment film commonly used among TFT-based liquid crystal display devices. Horizontal alignment film A has a higher voltage holding ratio than horizontal alignment film B. Horizontal alignment film B (trade name P1x1400 manufactured by Hitachi Chemical DuPont MicroSystems, Ltd.) is a horizontal alignment film used in a commercially-available horizontal alignment standard cell. Horizontal alignment film C (trade name AL1L509 manufactured by JSR Corporation) and horizontal alignment film D are alignment films which are commonly used in liquid crystal display devices of STN (Super Twisted Nematic) mode and IPS (In-Plane-Switching) mode, respectively.

First, the surface free energy of the four types of horizontal alignment films is measured. In the measurement, the average contact angle of a probe solution is measured by a sessile drop method using a solid-liquid interface analyzer (DropMaster-500) manufactured by Kyowa Interface Science Co., Ltd. As the probe solution, water, ethylene glycol, and diiodomethane are used. The surface free energies of these probe solutions are, respectively, 72.8 mJ/m$^2$, 47.7 mJ/m$^2$, and 50.8 mJ/m$^2$. Specifically, the above probe solutions are dispensed in the form of a drop of about 30 μl on the surfaces of the respective horizontal alignment films for measuring the contact angle. The average of 10 measurements of the contact angle is calculated to obtain the "average contact angle" for each of the probe solutions. Thereafter, the surface free energies of the horizontal alignment films are obtained by an analysis based on the Kitazaki-Hata method using a FAMAS surface free energy analysis add-in software which is an accompaniment of the measurement apparatus.

On horizontal alignment film B, the obtained contact angles of the drops of water, ethylene glycol, and diiodomethane were 76.6', 45.5°, and 26.6°, respectively. An analysis with the obtained contact angles showed that the surface free energy of this alignment film is 47±2.2 mJ/m$^2$. The surface free energies of horizontal alignment films A, C, and D obtained by the same analysis were 41 mJ/m$^2$, 54 mJ/m$^2$, and 65 mJ/m$^2$, respectively.

Then, above-described horizontal alignment films A to D are used to fabricate sample liquid crystal cells. Here, alignment films are formed on the surfaces of two glass substrates, and a liquid crystal mixture is injected between these glass substrates using a vacuum injection method. The formation method of the alignment films and the materials and mixing ratio of the liquid crystal mixture are the same as those described above. Thereafter, the liquid crystal mixture between the glass substrates is irradiated with light (ultraviolet) at the intensity of 50 mW/cm$^2$ so as to be polymerized and phase-separated, whereby the liquid crystal layer is formed. In this way, sample liquid crystal cells No. 1 to No. 4 which include horizontal alignment films A to D are fabricated.

Resultant sample liquid crystal cells No. 1 to No, 4 are dissected, and the liquid crystal in the small sections is washed away with an organic solvent. Then, over a cross-section to be observed, a thin conductive film is deposited by sputtering, and cross-sectional SEM observation is performed. Further, one of the glass substrates of the sample liquid crystal cells is peeled away, and planar SEM observation from the above of the liquid crystal layer is performed. The cross-sectional and planar SEM observations enable observation of the arrangement of the small sections defined by the polymer walls.

The results of the planar SEM observation were first compared with results of microscopic observation of the respective sample liquid crystal cells before the dissection with the use of an optical microscope. It was confirmed by the comparison that the shape and arrangement of the small sections which were detected by the planar SEM observation were identical to those of the liquid crystal regions in the respective sample liquid crystal cells before the dissection. Thus, it is inferred that the arrangement of the small sections along the thickness direction of the liquid crystal layer which was detected by cross-sectional SEM observation is identical to the arrangement of the liquid crystal regions along the thickness direction of the liquid crystal layer.

The results of cross-sectional SEM observation of the small sections are now described. FIGS. 3(a) and 3(b) show cross-sectional. SEM images of sample liquid crystal cells No. 1 and No. 2 which include horizontal alignment films A and B, respectively.

In sample liquid crystal cells No. 1 and No. 2, the liquid crystal layer 1 is interposed between the glass substrates 32, 33. The liquid crystal layer 1 includes the plurality of small sections 14 defined by the polymer walls 10.

In sample liquid crystal cell No. 1, as seen from FIG. 3(a), it was detected that part of the liquid crystal layer 1 included three or more small sections 14 arranged along the thickness direction of the liquid crystal layer 1. Thus, some of the plurality of small sections 14 formed in the liquid crystal layer 1 were in contact with the alignment film 12, 13, while there were small sections 14 at the center of the thickness of the liquid crystal layer 1 which were not in contact with any of the alignment films 12, 13. In the liquid crystal regions formed in these central small sections 14, there is a high probability that the liquid crystal molecules are scarcely regulated by the alignment films 12, 13 so that they are oriented generally vertically.

Also in the liquid crystal layers of sample liquid crystal cells No. 3 and No. 4, it was detected that there were three or more small sections arranged along the thickness direction of the liquid crystal layer as in the sample liquid crystal cell No. 1, and there were small sections at the center of the liquid crystal layer 1 which were not in contact with an alignment film.

In sample liquid crystal cell No. 2, as seen from FIG. 3(b), the small sections 14 were arranged in two layers with respect to the thickness direction of the liquid crystal layer 1. The small sections 14L of the lower layer were in contact with the alignment film 12. The small sections 14U of the upper layer were in contact with the alignment film 13. Therefore, a small section 14 which was not in contact with any of the alignment films 12, 13 was not detected. It is inferred from this that a liquid crystal region in which liquid crystal molecules are not regulated by the alignment films 12, 13 to be vertically oriented is scarcely formed. It was confirmed that sample liquid crystal cell No. 2 achieves higher response characteristics than the other sample liquid crystal cells No. 1, No. 3, and No. 4.

The results of measurement of the surface free energy of alignment films A to D and the arrangement of small sections in sample liquid crystal cells No. 1 to No. 4 are shown in TABLE 2.

TABLE 2

| Sample LC Cell | No. 1 | No. 2 | No. 3 | No. 4 |
|---|---|---|---|---|
| Alignment Film | A | B | C | D |
| Alignment Film Surface Free Energy (mJ/m$^2$) | 41 | 47 | 54 | 65 |
| Arrangement of Small sections (LC Regions) Along Thickness of LC Layer | 3 or more layers: LC regions at LC layer center are not in contact with alignment film. | 2 layers: Almost all LC regions are in contact with alignment film. | 3 or more layers: LC regions at LC layer center are not in contact with alignment film. | 3 or more layers: LC regions at LC layer center are not in contact with alignment film. |

From the results shown in TABLE 2, it was found that setting the surface free energy of the alignment film to, for example, not less than 44 mJ/m$^2$ and not more than 50 mJ/m$^2$ (analyzed by the Kitazaki-Hata method) more reliably ensures that the liquid crystal regions are arranged in not more than two layers. This can reduce the proportion of liquid crystal regions located at the center of the liquid crystal layer which are not regulated by any of the alignment films relative to all the liquid crystal regions located throughout the liquid crystal layer. Therefore, variation in retardation across a plane of the liquid crystal layer can be reduced, and hence, the display unevenness can also be reduced.

For sample liquid crystal cells No. 1 and No. 2, we peeled away one of the glass substrates and conducted a planar SEM observation from the above of the liquid crystal layer. In sample liquid crystal cell No. 1, many polymer aggregation regions were detected. In sample liquid crystal cell No. 2, the polymer and the liquid crystal regions were detected to be generally uniformly separated. Thus, it was found that, in the sample liquid crystal cell No. 2, uneven display which would occur due to polymer aggregations is prevented, so that higher display characteristics can be obtained.

<Alignment of Liquid Crystal Molecules in Liquid Crystal Regions 1>

Figure 4:
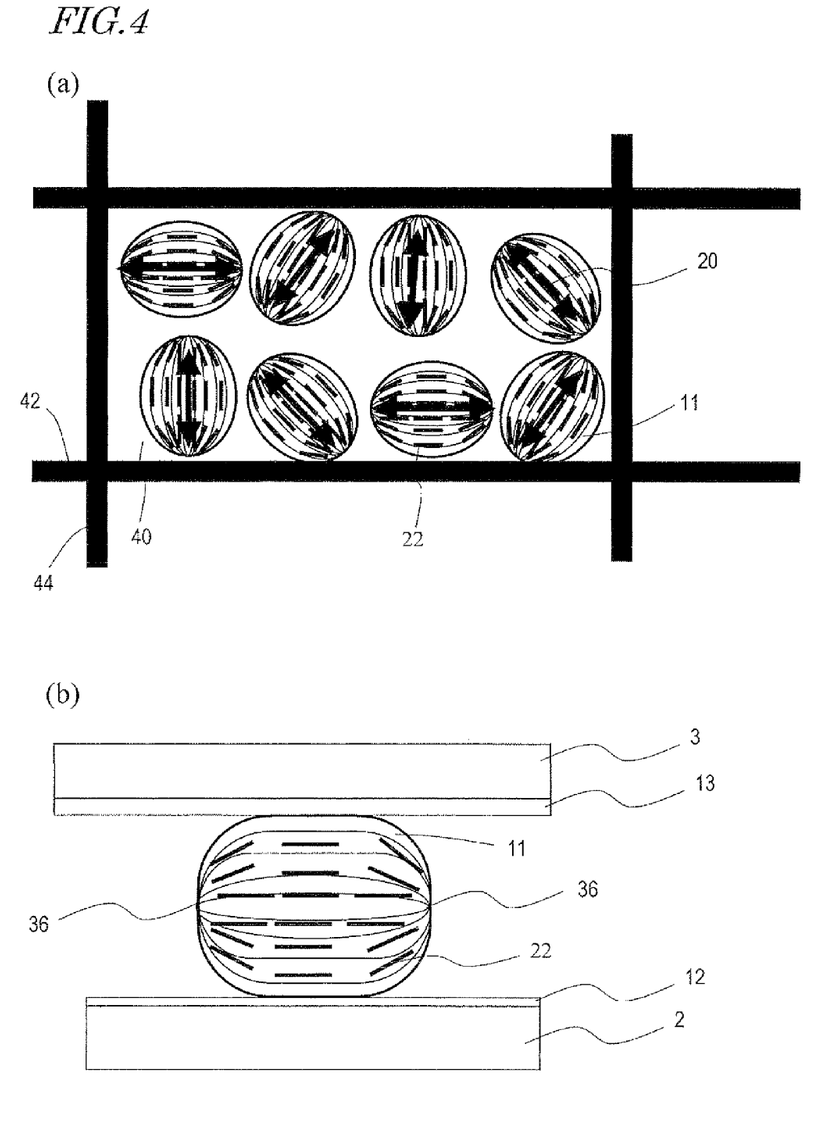

FIGS. 4(a) and 4(b) are schematic plan and cross-sectional views showing an example of the alignment of the liquid crystal molecules in the liquid crystal regions. FIG. 4(a) shows the alignment of a plurality of liquid crystal regions included in one pixel. FIG. 4(b) shows the alignment of one of the liquid crystal regions.

As shown in FIG. 4(a), a pixel 40 surrounded by source and gate lines 42, 44 includes a plurality of liquid crystal regions 11. As shown in FIG. 4(b), each of the liquid crystal regions 11 is in contact with the alignment films 12, 13. The director of the liquid crystal region 11 is oriented parallel to the substrate surface. In this case, the liquid crystal molecules 22 in the liquid crystal region are likely to generally uniformly align in a plane parallel to the substrate surface such that no disclination occurs in the liquid crystal region 11. As a result, in the shown example, the liquid crystal molecules 22 in the liquid crystal region 11 are aligned along lines extending between the opposite ends or "poles" 36 of the liquid crystal region 11. Therefore, the alignment vector (director) 20 of the liquid crystal region 11 is parallel to lines extending between the poles at the opposite ends.

Here, the alignment films 12, 13 are not provided with an alignment treatment, such as a rubbing treatment, or the like. Therefore, the directors 20 of the liquid crystal regions 11 in a plane are different from one another and thus oriented in random directions. Microscopically, each of the liquid crystal regions II has azimuthal dependence of the viewing angle due to the director 20. In the extent of one pixel, however, there are a plurality of liquid crystal regions 11 with random directors 20, and thus, the azimuthal dependence of the viewing angle characteristics is averaged.

Note that, in the present embodiment, the alignment of the liquid crystal molecules in the liquid crystal region 11 may be an alignment which has a director 20 in a plane. The present embodiment is not limited to a bipolar alignment with the two poles 36 such as shown in the drawings. Further, two or more liquid crystal regions 11 which have directors 20 in a plane may be provided in one pixel. Desirably, almost all the liquid crystal regions 11 in one pixel have directors 20 in a plane, and no disclination is included in the liquid crystal regions 11. A liquid crystal region which does not meet such desirable conditions may be included in the pixel. For example, some of the liquid crystal regions in a pixel may have a radial alignment, or a disclination may occur in a liquid crystal region.

<Alignment of Liquid Crystal Molecules in Liquid Crystal Regions 2>

We fabricated sample liquid crystal cells which have a liquid crystal layer of a one-layer structure and examined the alignment of the liquid crystal regions. The procedure and results of the examination are described below.

First, a sample liquid crystal cell of a one-layer structure ("sample liquid crystal cell No. 5") is fabricated in the same way as the above-described sample liquid crystal cells. The alignment film used herein is horizontal alignment film B which has the surface free energy of 47 $mJ/m^2$. A vacuum injection method is used in the formation of the liquid crystal layer. The irradiation intensity of light for the liquid crystal mixture is 20 $mW/cm^2$. In thus-fabricated sample liquid crystal cells No. 5, the liquid crystal regions are larger than the liquid crystal regions shown in FIG. 3(b) and are placed so as to be in contact with the alignment films of the front substrate and the rear substrate (the height of the liquid crystal regions the thickness of the liquid crystal layer).

Then, to examine the alignment of the liquid crystal regions in the liquid crystal layer of sample liquid crystal cell No. 5, sample liquid crystal cell No. 5 is observed in a direction normal to the substrate using a polarizing microscope.

FIG. 5(a) shows a microscopic image obtained by observation of sample liquid crystal cell No. 5 using a transmission polarizing microscope in crossed Nicols. FIG. 5(b) shows a microscopic image obtained with the polarizer being rotated by 45° from the arrangement of FIG. 5(a). Lines A, P shown in the drawings respectively indicate the directions of the transmission axes of the polarizer and the analyzer of the polarizing microscope.

In the observation, a disclination line was not detected in a liquid crystal droplet. It was appreciated from this that the liquid crystal molecules are generally uniformly aligned in each of the liquid crystal regions to constitute a mono-domain. The width of each liquid crystal region was about 5 to 15 μm.

In FIG. 5(a), some of the liquid crystal regions do not transmit light so that they look black. As the polarizer is rotated, these liquid crystal regions transmit light so that they look white. Likewise, in FIG. 5(b) also, some of the liquid crystal regions look black, and these liquid crystal regions look white as the polarizer is rotated. From this, it was confirmed that the alignment orientation in a plane of the liquid crystal region (director) varies among the liquid crystal regions. Further, in both FIGS. 5(a) and 5(b), regions that look black and regions that look white occurs at substantially random. It was confirmed from this fact that liquid crystal regions with different directors occur at random in the liquid crystal layer and that the viewing angle can be increased.

Then, sample liquid crystal cell No. 5 was dissected, and the liquid crystal in the liquid crystal regions was washed away with an organic solvent. Thereafter, a conductive film was deposited by sputtering over a cross-section, and cross-sectional SEM observation was performed. Then, one of the glass substrates was peeled away from sample liquid crystal cell No. 5, and the liquid crystal layer was observed from the above (planar SEM observation).

Figure 3:
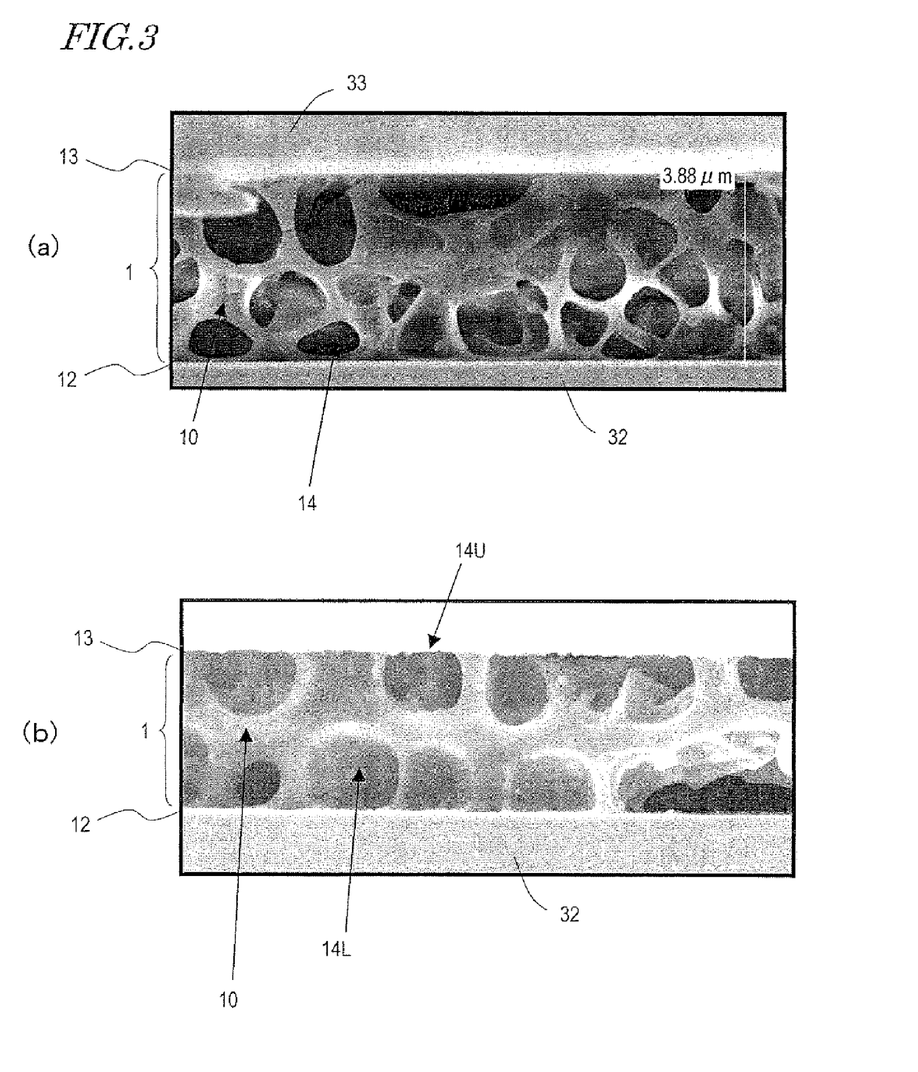

FIGS. 6(a) and 6(b) show a cross-sectional SEM image and a planar SEM image of sample liquid crystal cell No. 5. For the sake of simplicity, elements similar to those of the sample liquid crystal cells shown in FIG. 3 are denoted by the same reference numerals, and the description thereof is herein omitted.

As seen from FIG. 6(a), it was detected that the small sections 14 formed by the polymer walls 10 were arranged in one layer with respect to the thickness direction of the liquid crystal layer 1, and that each of the small sections 14 was in contact with both the upper and lower alignment films 12, 13. As such, the liquid crystal molecules in the liquid crystal region formed in each of the small sections 14 were more surely regulated by the alignment films 12, 13 so as to align in parallel to the substrate. Thus, it was confirmed that the viewing angle characteristics can be improved more effectively. It was also found that the polymer walls 10 were substantially vertical to the substrate. On the other hand, it was found from FIG. 6(b) that the polymer walls 10 were continuous, and the thickness of the walls 10 was generally uniform.

Figure 7:
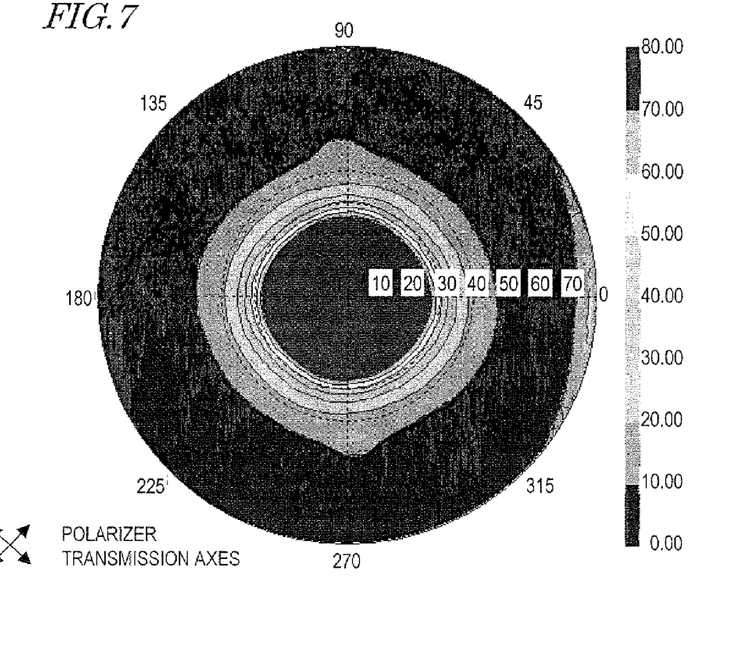
[FIG. 7] A chart which shows a result of measurement of the azimuthal dependence of the contrast of display with the use of sample liquid crystal cell No. 6.

We fabricated another sample liquid crystal cell including a liquid crystal layer of a one-layer structure and measured the azimuthal dependence of the contrast of display in the present embodiment. The result of the measurement is shown in FIG. 7.

First, a sample liquid crystal cell of a one-layer structure ("sample liquid crystal cell No. 6") is fabricated in the same way as the above-described sample liquid crystal cells. The alignment film used herein is horizontal alignment film B which has the surface free energy of 47 mJ/m$^2$. A vacuum injection method is used in the formation of the liquid crystal layer. The irradiation intensity of light for the liquid crystal mixture is 20 mW/cm$^2$.

Figure 5:
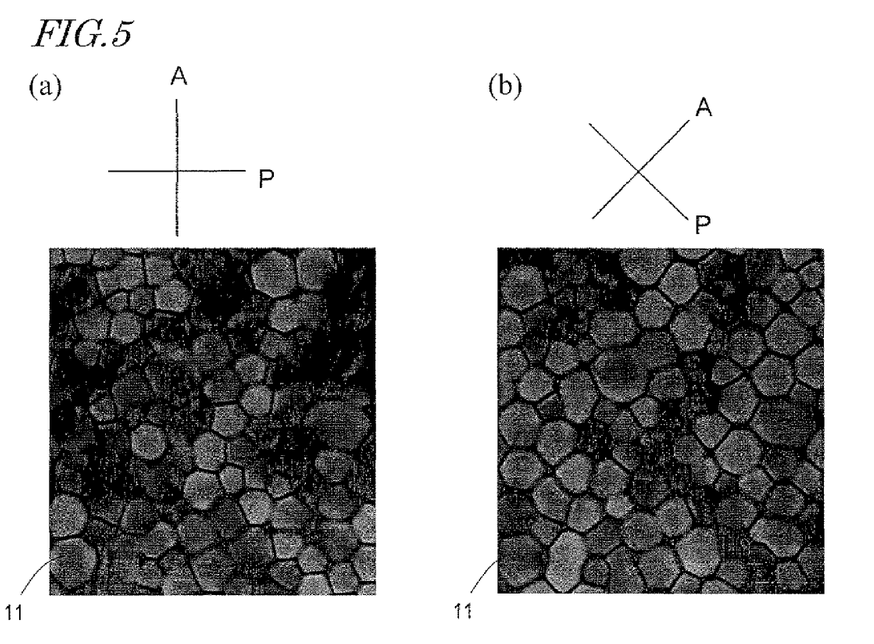
Figure 6:
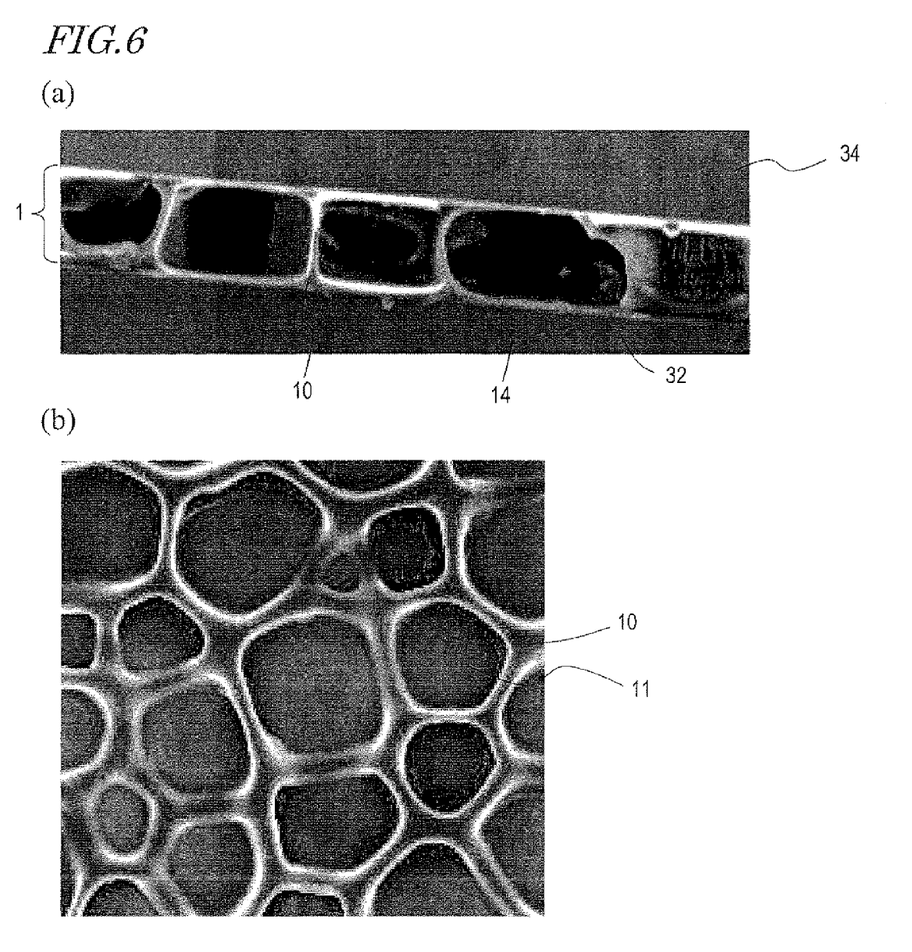

The liquid crystal layer of fabricated sample liquid crystal cell No. 6 has the same structure as that of the liquid crystal layer of sample liquid crystal cell No. 5 shown in FIG. 5 and FIG. 6. The contrast of display was determined by calculating the ratio of the intensity of light transmitted in the presence of an applied voltage (black display) to the intensity of light transmitted in the absence of an applied voltage (white display). It was found from this result that the contrast scarcely depends on the azimuth. It was therefore confirmed that a liquid crystal display device with small azimuthal dependence can be realized without using a special alignment division means.

Thus, according to the present embodiment, the azimuthal dependence of the viewing angle can be greatly decreased, and an alignment division effect can be obtained which is similar to those achieved in MVA mode and PVA mode display devices. FIG. 7 shows the azimuthal dependence of the liquid crystal layer in which the liquid crystal regions are arranged in one layer with respect to the thickness direction of the liquid crystal layer (one-layer structure). Likewise, even in a liquid crystal layer in which the liquid crystal regions are arranged in two layers (two-layer structure), the azimuthal dependence can be greatly decreased. In the liquid crystal layer of the one-layer structure, the contrast of display can advantageously be higher than that of the liquid crystal layer of the two-layer structure.

In the examples described above, to control the configuration of the small sections in the liquid crystal layer, an alignment film having a predetermined surface energy was selected. The surface energy of the alignment film may be controlled by reforming the surface of the alignment film using a monomolecular adsorption film, or the like. The preferred range of the surface energy of the alignment film may be on substantially the same order as the surface energy of the liquid crystal (e.g., the difference is 20% or less) and is not limited to the above-identified values of the surface energy of alignment film B.

Figure 1:
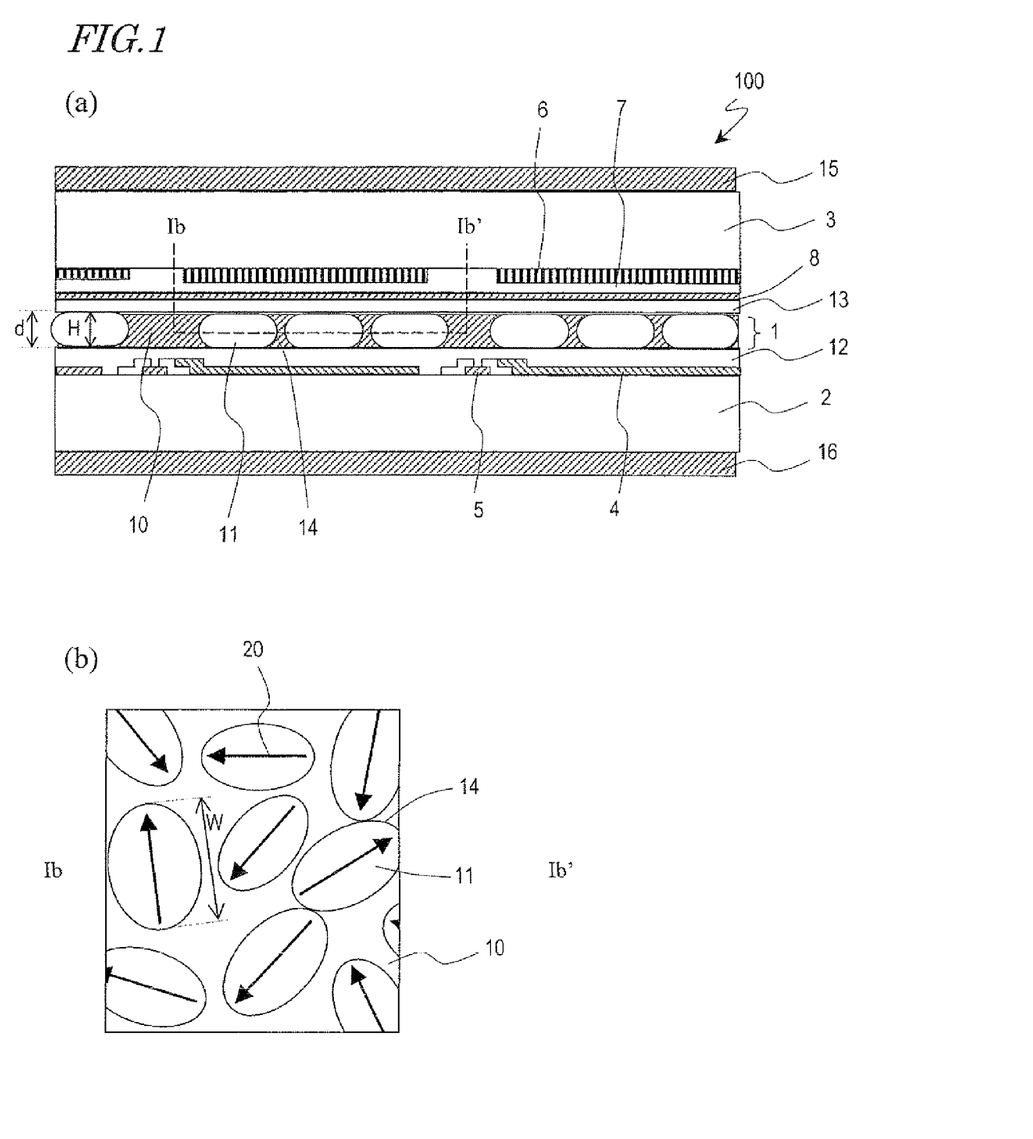
Figure 8:
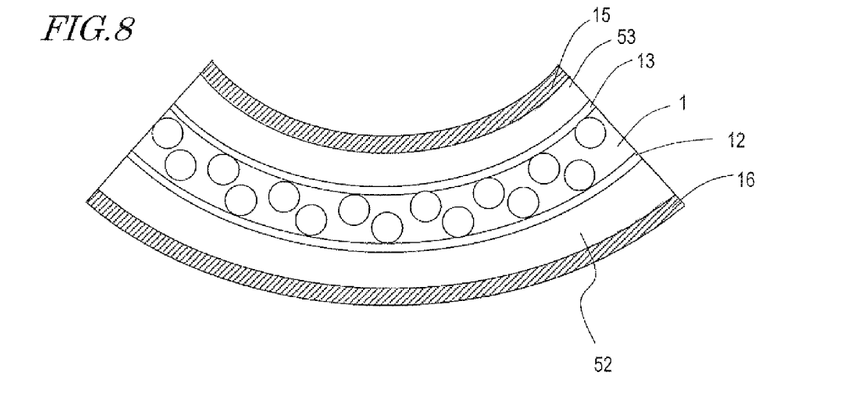
[FIG. 8] A schematic cross-sectional view of another display device of an embodiment of the present invention.

The structure of the display device of the present embodiment is not limited to that shown in FIG. 1. The front and rear substrates may be plastic substrates or may be curved substrates. Alternatively, flexible substrates 52, 53 as shown in FIG. 8 may be used.

INDUSTRIAL APPLICABILITY

According to the present invention, a liquid crystal display device with excellent viewing angle characteristics and excellent response characteristics can be provided. Also, such a liquid crystal display device can be manufactured using a simple manufacturing process at a low cost.

The present invention is applicable to a wide variety of liquid crystal display devices and a wide variety of electric devices that include liquid crystal display devices. In particular, the present invention is suitable to a transmission-type or reflection-type liquid crystal display device which uses a horizontal alignment type liquid crystal.

The invention claimed is:

1. A liquid crystal display device having a plurality of pixels, comprising:
    a liquid crystal layer;
    a front substrate and a rear substrate between which the liquid crystal layer is held;
    a pair of electrodes between which the liquid crystal layer is interposed and which are configured to apply a voltage across the liquid crystal layer;
    circular polarizers respectively provided on a front side of the front substrate and a rear side of the rear substrate; and
    first and second alignment films respectively provided between the liquid crystal layer and the front substrate and between the liquid crystal layer and the rear substrate,
    wherein the liquid crystal layer includes, in each of the pixels,
        a continuous wall,
        a plurality of small sections separated by the wall, and
        a plurality of liquid crystal regions, each of which is formed in any one of the plurality of small sections, and
    the plurality of liquid crystal regions include first and second liquid crystal regions which have directors in a plane parallel to the liquid crystal layer, the directors of the first and second liquid crystal regions are oriented in different directions.

2. The liquid crystal display device of claim 1, wherein another small section does not intervene between each of the plurality of small sections and the first and second alignment films.

3. The liquid crystal display device of claim 1, wherein another small section does not intervene between each of the plurality of small sections and one of the first and second alignment films which is closer to the each small section.

4. The liquid crystal display device of claim 1, wherein each of the plurality of liquid crystal regions is in contact with any one of the first and second alignment films.

5. The liquid crystal display device of claim 1, wherein the first and second alignment films are not provided with an alignment treatment.

6. The liquid crystal display device of claim 1, wherein a surface free energy of the first and second alignment films is not less than 44 mJ/m$^2$ and not more than 50 mj/m$^2$.

7. The liquid crystal display device of a claim 1, wherein the liquid crystal layer includes four or more small sections in each pixel.

8. The liquid crystal display device of claim 7, wherein the liquid crystal layer includes eight or more small sections in each pixel.

9. The liquid crystal display device of claim 1, wherein a dielectric anisotropy of a liquid crystal material of the liquid crystal layer is positive.

10. The liquid crystal display device of claim 1, wherein the liquid crystal region does not contain a chiral agent.

11. The liquid crystal display device of claim 1, wherein
    an average length of the plurality of small sections along a thickness direction of the liquid crystal layer is not less than 2 μm and not more than 6 μm, and
    an average length of the plurality of small sections in a plane parallel to the liquid crystal layer is not less than 2 μm and not more than 50 μm.

* * * * *